Patented Aug. 7, 1951

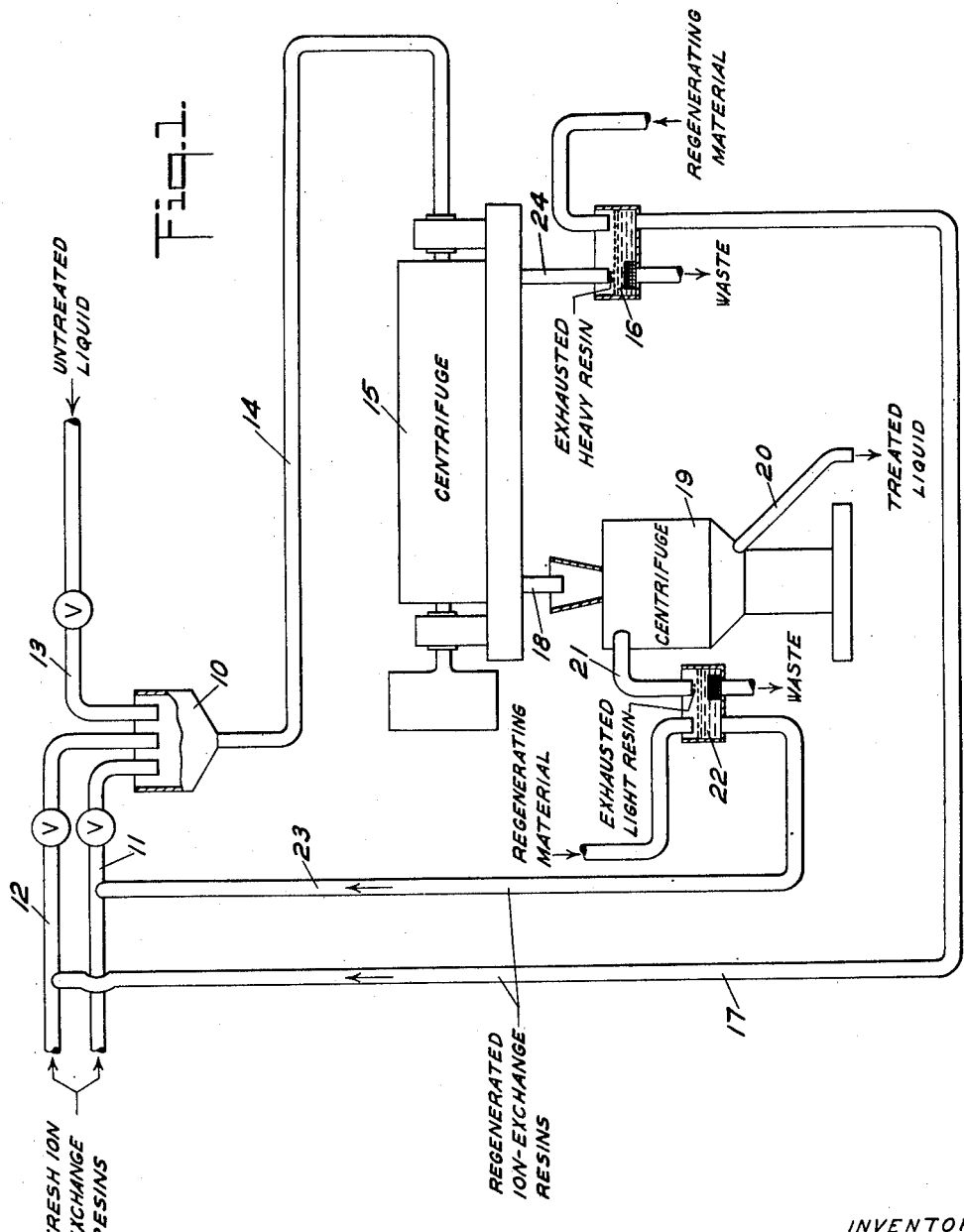

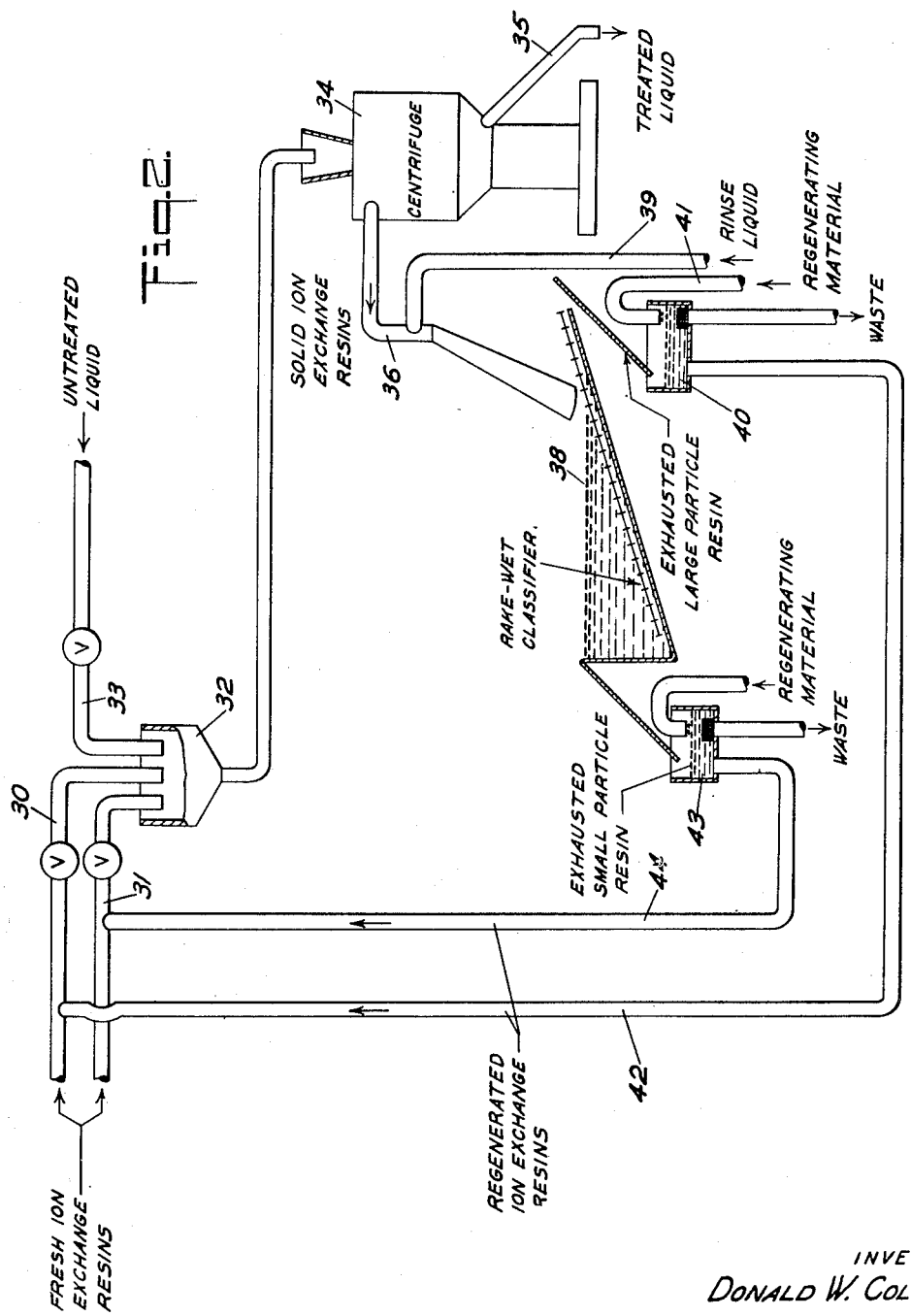

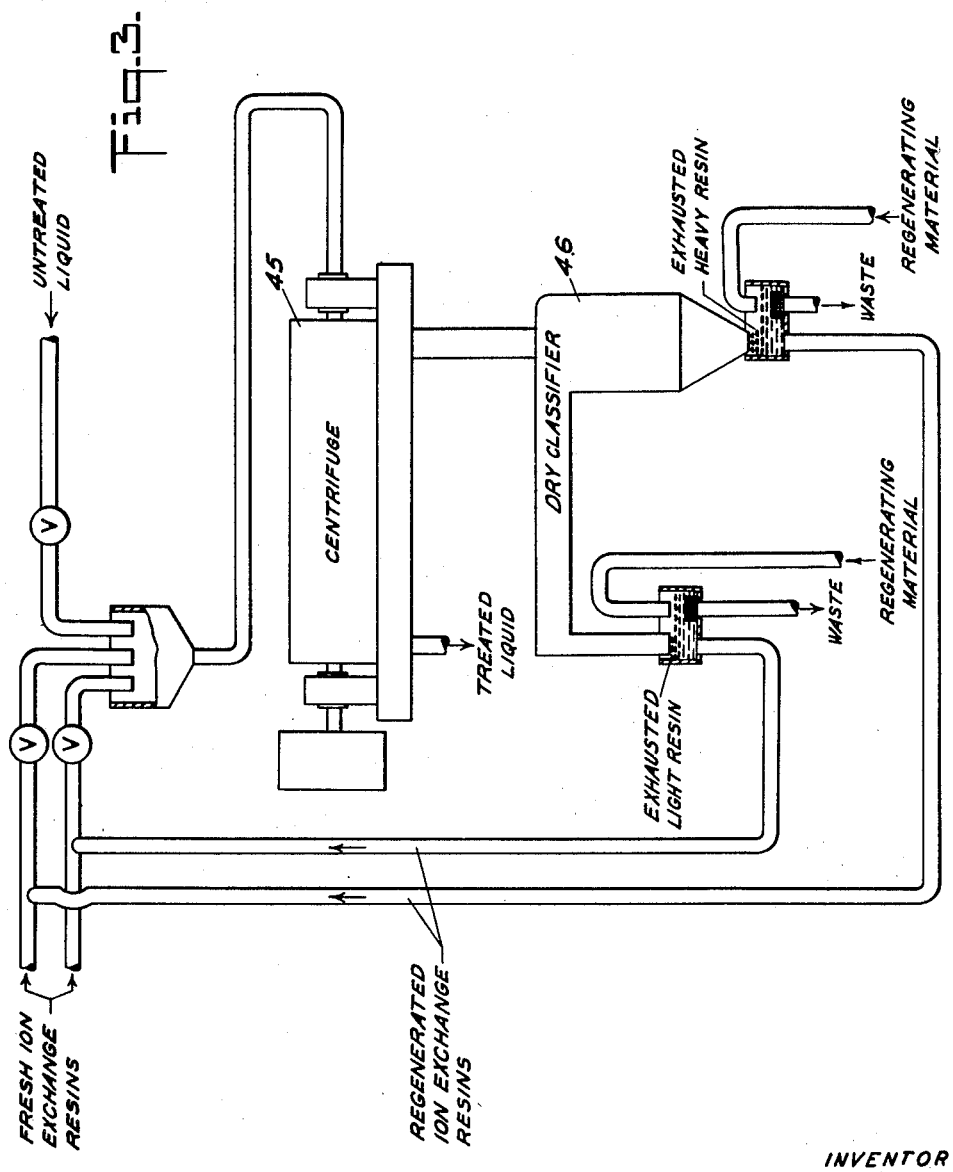

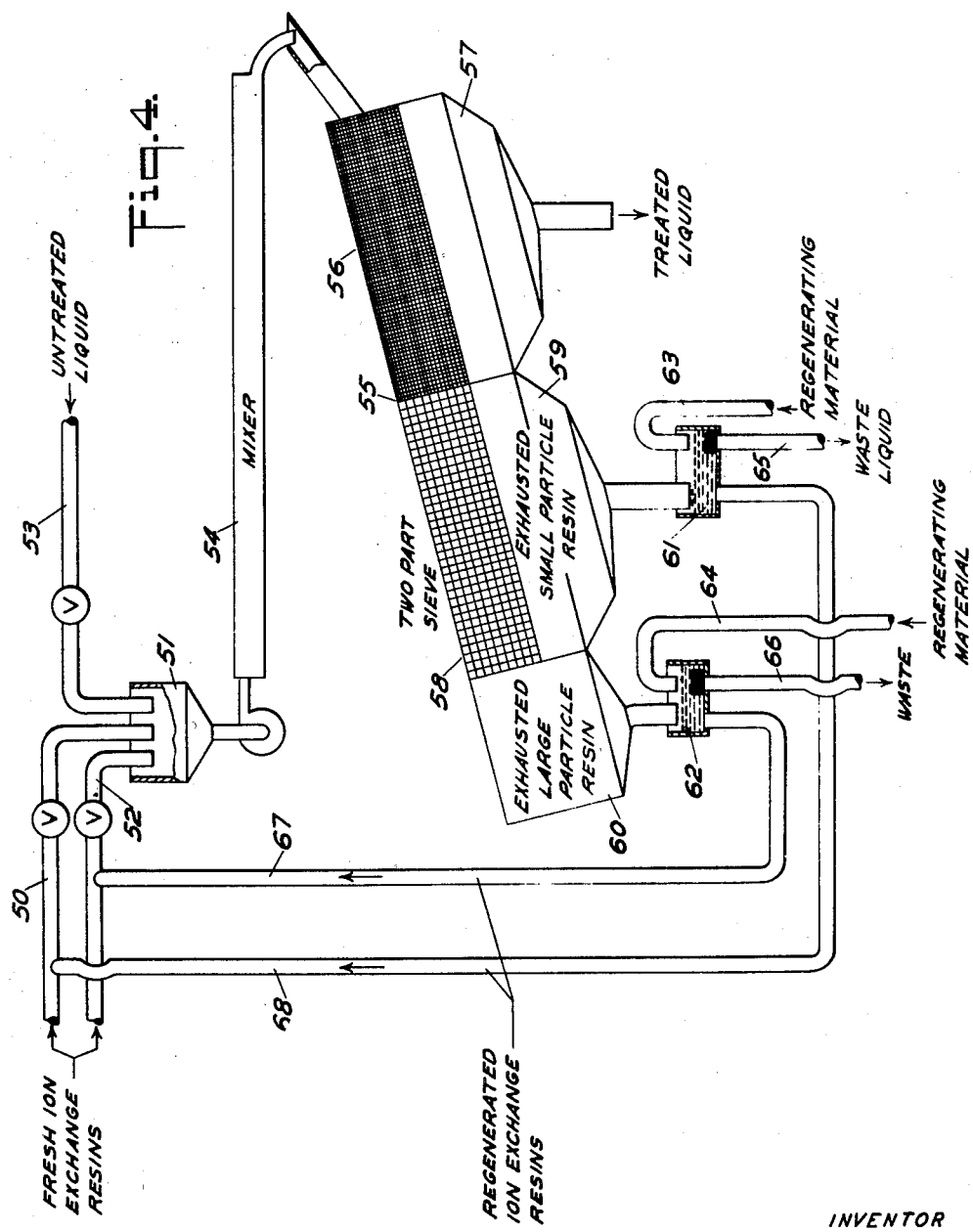

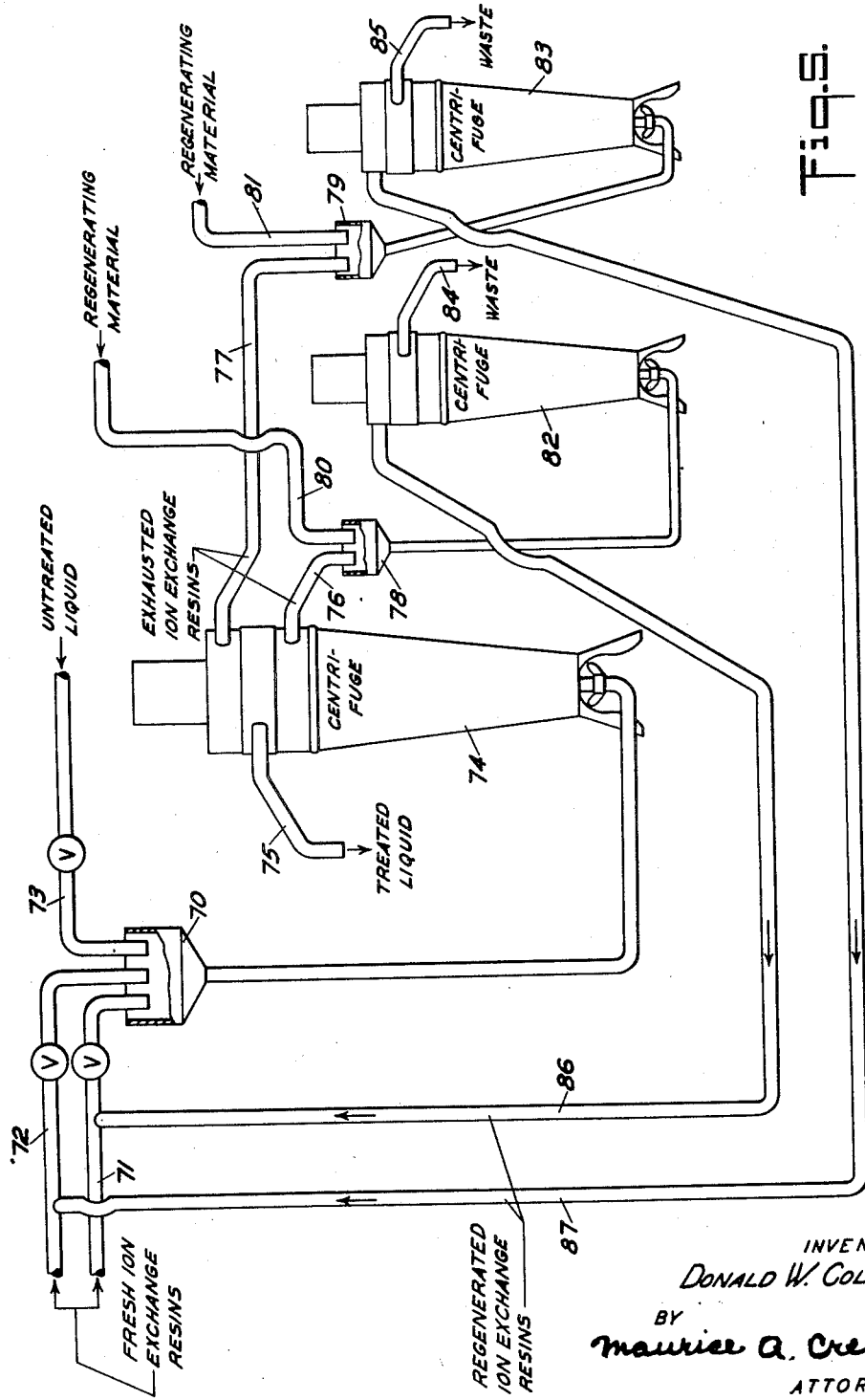

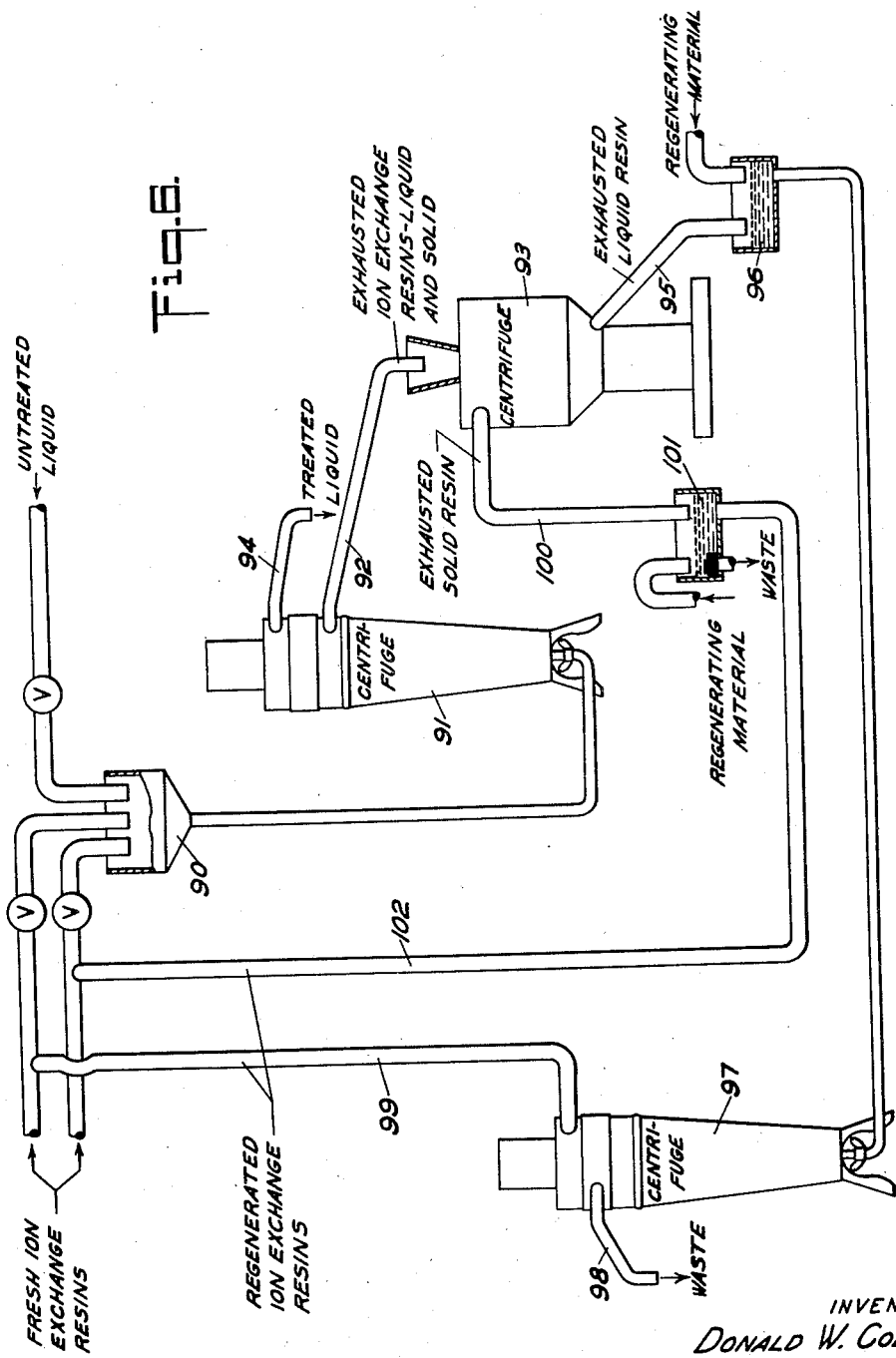

2,563,006

UNITED STATES PATENT OFFICE 2,563,006

TREATMENT OF LIQUIDS WITH ION EXCHANGE MATERIALS

Donald W. Collier, Philadelphia, Pa., assignor to The Sharples Corporation, a corporation of Delaware Application November 2, 1946, Serial No. 707,490

16 Claims. (Cl. 127—46)

This invention pertains to the treatment of liquids with ion exchange materials.

Cation and anion exchange materials have been frequently employed to remove dissolved and sometimes suspended constituents in liquids. Many types of liquids have been so treated; water, beet and cane sugar juices and gelatins are the principal examples. The normal use of ion exchange materials in liquid purification is accomplished through a primary treatment with the cation exchange material and a secondary treatment with anion exchange material. Multiple beds of each type of exchange material may be used, alternating anion and cation materials and regulating the flow in order to control the time of exposure of the liquid to each type of bed.

The ion exchange materials previously used have been of two general types—organic materials, sometimes known as "organolites," and zeolites. The present invention is not limited to the employment of a particular type of ion exchange material; neither is it concerned with the preparation of these materials. The preparation of anion exchange materials has been described in Patents 2,151,883, 2,354,671, 2,251,234, 2,246,527 and others. Cation exchange materials of an organic nature are described in Patents 2,204,539, 2,391,831, 2,319,359 and others. Carbonaceous zeolite materials acting on a hydrogen cycle are described in Patents 2,191,059, 2,376,896 and others. These types of materials and many others, whether of a resinous organic nature or a non-organic type, may be used in the present invention.

Since ion exchange resins of an organic nature are especially adaptable to the practice of this invention, they will be referred to in connection with the ion exchange process to be described, but not by way of limitation of the invention.

This ion exchange process comprises intimately mixing the anion and cation exchange materials with each other and with the liquid to be treated to form a fluid suspension of said exchange materials suspended in said liquid. The ion exchange materials used; for example, resins, are chosen or modified to have physical properties significantly different from those of the liquid being treated and from each other. This permits them to be separated easily from each other and from the treated liquid by physical separation methods when the ion exchange property approaches exhaustion. This separation permits separate regeneration of each type of ion exchange material; following regeneration the materials can be remixed with untreated liquid to repeat the cycle. Thus a continuous process may be carried on in ion exchange treatment of liquids, eliminating the disadvantages inherent in batch treatment processes.

In the preferred embodiment of this invention, the separation of the ion exchange materials from each other and from the treated liquid is accomplished by centrifugal means. In this way the separation is performed in a very brief time and strict control of the time of contact between each of the ion exchange materials and the liquid undergoing treatment may be obtained. The intimate contact between the resins and the liquid prior to separation makes for rapid ion exchange and more nearly uniform exhaustion of the resin particles. Further, clean separation of the resins from the liquid and from each other may be accomplished in this manner.

In the prior art employment of ion exchange materials, the cation bed or cell has been regenerated with acid or with the salt of an alkaline metal (such as sodium chloride), and the anion exchange bed or cell has been regenerated with a base or basic salt. Any desirable method of regeneration may be employed in the present invention.

In treating liquids with ion exchange materials which are maintained in individual cation and anion beds, the hydrogen ion content of the liquid becomes high after the cation exchange treatment and the hydrogen ions remain until removed by the anion exchange treatment. Undesirable reactions which are catalyzed by a high concentration of hydrogen ions frequently take place while the liquid is being treated in the cation bed and during passage of the liquids to the anion bed. Various expedients such as low temperature have been employed to reduce these harmful reactions, but they have been expensive and not entirely effective.

It is a feature of the invention to provide means for control of the hydrogen ion content of a solution being subjected to ion exchange treatment.

Another feature of the invention is to prevent the formation of precipitates which will foul the ion exchange beds or plug the piping through which the treated liquid is conducted to other parts of the process.

In cases in which precipitates cannot be entirely eliminated, it is a feature of this invention to mitigate the effects of the precipitated material on the equipment.

Further features of the invention are to obtain a more rapid ion exchange between the materials employed and the treated liquid, to secure more nearly uniform exhaustion of the ion exchange material and to reduce the required inventory of ion exchange material. Other features will become evident after examination of the following description and the attached drawings. These include examples of separation methods depending upon significant difference in physical properties.

It is intended that these examples should be illustrative but not limiting in character.

Figure 1 is a diagrammatic view showing a method of treating liquid with two solid resins of significantly different densities, and Figures 2 through 6 are similar views illustrating various other methods of and apparatus for practicing the invention.

In the process shown in Figure 1, a solid anion resin of density less than the liquid undergoing treatment and a solid cation resin of density greater than the liquid are fed into a container 10 through conduits 11 and 12, respectively. The liquid flows to the container 10 through conduit 13. The mixture flows from the container 10 through a mixer section 14 and into a centrifuge 15 of the type shown in the application of Fred P. Gooch, Serial No. 722,124, filed January 15, 1947, for "Centrifugal Separator." In this centrifuge the mixture of liquids and solids is fed into an imperforate conical bowl or rotor; liquids and lighter solids are discharged from the large end of the bowl at a greater distance from the center of rotation than the point of discharge of heavier solids. Heavier solids, deposited on the inner bowl wall under centrifugal force, are moved longitudinally of the bowl to discharge ports at the small end of the bowl by an impeller which rotates at a speed slightly different from that of the bowl.

Exhausted heavier resin passes from the centrifuge discharge port 24 into a regenerating chamber 16; after regeneration, it is returned to the process through a conduit 17. The lighter resin and the treated liquid leave the centrifuge through another discharge port 18 and pass into a centrifuge 19 of the type shown in Patent 2,095,206, granted October 5, 1937, for "Machine and Methods for Separating Solids from Liquids." Treated liquid is separated from the lighter resin in this centrifuge and discharged through a conduit 20. The exhausted lighter resin passes from the centrifuge through a conduit 21 and into a regenerating chamber 22. After regeneration the lighter resin is returned to the process through a conduit 23.

Two solid ion exchange resins of significantly different densities or particle sizes are fed through conduits 30 and 31 into a container 32 in Figure 2. The untreated liquid is fed to the container through a conduit 33. From the container 32 the mixture passes to a centrifuge 34 such as that disclosed in Patent 2,095,206. In this centrifuge 34 the two solid resins are separated from the treated liquid which passes off through a conduit 35. The solid resins pass through conduit 36 into a wet classifier 37 of the rake or bowl type.

The liquid 38 employed in this classifier is fed through a conduit 39. This liquid may be suitable as a rinse for the resins, and its density may be adjusted to give a clean-cut separation of the resins. The heavy or large particle resin is discharged from the classifier into a container 40. After treatment with regenerating material which flows in through a conduit 41 this resin is returned through a conduit 42 for another cycle. The light or small particle resin is discharged from the classifier 37 into a container 43; after regeneration it is returned to the process through a conduit 44.

Figure 3 shows a process which may also be employed when the two solid ion exchange resins differ significantly in density (both must be heavier than the liquid which is being treated) or particle size. This process is similar to that shown in Figure 2 except that the centrifuge 45 is of the type shown in the application of Fred P. Gooch, Serial No. 722,124, filed January 15, 1947, for "Centrifugal Separator." A dry classifier 46 preferably of the "cyclone" or of the "whizzer" type is used to separate the resins after they have been discharged from the centrifuge.

In the process illustrated in Figure 4, a solid cation resin of small particle size is fed through a conduit 50 into a container 51; a solid anion resin of larger particle size is fed through a conduit 52 into the container 51. Untreated liquid flows to the container 51 through a conduit 53. From the container 51 the mixture is pumped through a mixer pipe or agitator 54 and into a two-part sieve 55. The treated liquid is separated from the resins in an initial fine-mesh portion 56 of the sieve and passes into a collector 57.

A subsequent larger mesh portion 58 of the sieve allows the small sizes particles of the cation resin to pass into a hopper 59. The large sized particles of the anion resin pass out of the end of the sieve into a hopper 60. From the hoppers 59 and 60 the resins flow into containers 61 and 62 in which they are separately regenerated with regenerating materials passed into the containers through conduits 63 and 64. Waste materials of the regeneration treatment flow out through conduits 65 and 66, and the regenerated ion exchange resins are returned to the process through conduits 67 and 68.

In the above described process the resins may be premolded into different shapes such that the cation resin will pass through the second portion 58 of the sieve while the shape of the anion resin allows it to pass over this portion of the sieve and out into the hopper 60.

When two liquid resins which differ significantly in density are used to treat another liquid as in Figure 5, the three liquids flow to the container 70 through conduits 71, 72 and 73. A centrifuge 74 of the tubular bowl type simultaneously separates the resins from each other and from the treated liquid which flows out through a conduit 75. The exhausted resins flow through conduits 76 and 77 to regenerating chambers 78 and 79 where they are mixed with regenerating materials flowing in through conduits 80 and 81. The undesirable products of regeneration are separated from the liquid resins in the centrifuges 82 and 83 and discharged through conduits 84 and 85. The regenerated resins are returned to the process through conduits 86 and 87.

A liquid resin and a solid resin, both differing significantly in density from the liquid being treated, are employed in the process shown in Figure 6. After being mixed with the untreated liquid in container 90, the resins are separated from the treated liquid in the tubular bowl centrifuge 91 and discharged through a conduit 92 into a centrifuge 93 of the type shown in Patent 2,095,206. The treated liquid is discharged from the centrifuge 91 through a conduit 94. In the centrifuge 93 the liquid resin is separated from the solid resin and discharged through a conduit 95 into a regenerating chamber 96. The undesirable products of regeneration are separated from the liquid resin in a centrifuge 97 and discharged through a conduit 98. The liquid resin is returned to the process through a conduit 99. After being discharged from the centrifuge 93 through a conduit 100 the solid resin is regenerated in a chamber 101 and returned to the process through a conduit 102.

As illustrated, separation of anion exchange materials from cation exchange materials within the scope of this invention may be based on significant natural or induced variances in such physical properties as density, size of particle, shape of particle, boiling point, freezing point, specific heat, coefficient of thermal expansion, heat conductivity, electrical conductivity and color. The two ion exchange materials—anion and cation—must possess physical properties which permit them to be readily separated from each other and from the treated liquid by physical separation means.

Physical properties such as size of particle and shape of particle may be varied in the formation of the ion exchange materials or by subsequently reshaping such materials under pressure and heat. The densities of ion exchange materials may be varied by mixing additives of higher or lower specific gravity with these materials, such additives being normally neutral materials which take no part in the reaction of ion exchange but merely have a physical effect either in increasing or decreasing the density of the particular ion exchange material with which they are mixed. Such additives may in themselves make a sufficient difference in density to permit separation of ion exchange materials, or they may be used to increase an already existent difference in density, thus facilitating separation.

For example, the additive may be an extender which will reduce the density of the material. A particular extender which has been employed successfully in this invention with a resin of the polyamine phenol formaldehyde type is a polyethylene which is polymerized ethylene. An example of a polyethylene suitable for use is the polyethylene having a molecular weight ranging from 5,000 to 20,000 manufactured by du Pont and known as "Polythene."

The ion exchange materials employed in the operation of this invention may be in the solid state, or one or both may be liquid. If either (or both) ion exchange material is liquid, it (or they) must differ in physical properties from the liquid being subjected to treatment and purification.

In mixing the two ion exchange materials into the liquid to be treated or purified any desired sequence may be employed within the scope of the invention. The anion and cation exchange materials may be mixed and then introduced into the liquid; either the anion or the cation exchange material may be mixed with the liquid and then the other added; or all three materials may be mixed simultaneously. These mixing operations may be carried out in a container or chamber or in a mixer pipe-section. Frequently it is advantageous to have a countercurrent flow between the liquid and one or both of the resins before the separation step occurs. Similarly in separating the ion exchange materials from the liquid alternative methods may be employed.

While sequence of operations in mixing the anion resin, the cation resin and the untreated liquid has not been discussed in the above examples, it will be obvious that a preliminary mixing operation involving two or all of these components may be carried out if desired in a particular treatment of liquid. The sequence of operations in separating the elements of the mixture may be varied in accordance with the separation technique which is employed and the characteristics desired in the treated fluid.

There is some evidence that certain changes in the physical properties of the resins employed in the ion exchange treatment of liquids may increase or retard the rate of ion exchange. Adjustment of the timing of contact between each of the resins and the liquid undergoing treatment may be made to counteract the effects of the physical changes of the resins which have been made in practicing the invention. For example, if the particle size of the anion resin is increased, it may lead to a slower rate of anion exchange. To counteract this the anion resin may be introduced into the liquid earlier in the process and separated from the liquid later; the increased contact time with the anion resin would thus balance the slower rate of anion exchange.

Control of the pH of a liquid being purified or treated by means of ion exchange materials is accomplished in this invention by performing at least a portion of the cation exchange and the anion exchange operations simultaneously. By proper control of the relative amounts of anion exchange material and cation exchange material employed relatively fine control of pH can be obtained and the hazards of losing valuable materials which might otherwise be decomposed by acid or basic media can be minimized. By careful control of the relative amounts of anion and cation exchange materials added, the pH of the treated liquid may be held at a favorable operating condition throughout a continuous ion exchange treatment.

An example of a requirement for pH control is in the treatment of sugar juices to remove ash and other impurities by ion exchange with organic resins; in this case, the inversion of sucrose to other less valuable sugars is catalyzed by acid media. The present methods of treating sugar solutions with ion exchange materials in which alternate beds of cation and anion exchange materials are employed involve low temperatures to avoid inversion in the resulting acid solutions from the cation beds. This is a great handicap in hot climates in which sugar is produced and also because sugar juices in several well known processes are at elevated temperatures at the point at which ion exchange treatment would normally be applied. Since the juices normally must be heated again immediately following ion exchange treatment, the necessity for cooling them in order to perform a satisfactory purification with ion exchange materials without inversion has been a decided handicap.

Other modifications within the scope of the invention will be apparent to those who are skilled in the art, and I therefore wish to be limited only by the following claims.

I claim:
1. In the treatment of a liquid with ion exchange materials, the process comprising, continuously mixing the liquid with anion exchange material and with cation exchange material to form a fluid suspension in which said exchange materials are suspended in said liquid, said anion and cation exchange materials differing in physical properties from each other and from the liquid, and continuously flowing said suspension away from the point of the mixing until the desired ion exchange has been substantially effected, and separating the liquid, the anion exchange material and the cation exchange material by means of the differences in physical properties.

2. In the treatment of a liquid with ion exchange materials, the process comprising mixing anion exchange material and cation exchange material, said anion and cation exchange materials differing in physical properties, from each other and from the liquid, continuously introducing the resulting mixture into the liquid to form a fluid suspension in which said exchange materials are suspended in said liquid, and continuously flowing said suspension away from the point of said mixing until the desired ion exchange has been substantially effected, and separating the liquid, the anion exchange material and the cation exchange material by means of the differences in physical properties.

3. In the treatment of a liquid with ion exchange materials, the process comprising, continuously mixing the liquid with solid anion exchange material and solid cation exchange material to form a fluid suspension in which said exchange materials are suspended in said liquid, said anion exchange material and said cation exchange material differing in density, and continuously flowing said suspension away from the point of the initial mixing until the desired ion exchange has been substantially effected, and separating said solid ion exchange material from said liquid and from each other, said anion and said cation exchange materials being separated from each other by means of the difference in their density.

4. In the treatment of a liquid with ion exchange materials, the process comprising, continuously mixing the liquid with solid anion exchange material and solid cation exchange material to form a fluid suspension in which said exchange materials are suspended in said liquid, said anion exchange material and said cation exchange material differing in particle size, and continuously flowing said suspension away from the point of mixing until the desired ion exchange has been substantially effected, and separating said solid ion exchange materials from said liquid, and from each other other, said anion and said cation exchange materials being separated from each other by means of the difference in their sizes.

5. In the treatment of a liquid with ion exchange materials, the process comprising, continuously mixing the liquid with solid anion exchange material and solid cation exchange material to form a fluid suspension in which said exchange materials are suspended in said liquid, said anion exchange material and said cation exchange material differing in shape, and continuously flowing said suspension away from the point of mixing until the desired ion exchange has been substantially effected, and separating said solid ion exchange materials from said liquid and from each other, said anion and said cation exchange materials being separated from each other by means of the differences in their shapes.

6. In the treatment of a liquid with ion exchange resins, the process comprising, continuously mixing in a mixing zone, the liquid, anion exchange resin and cation exchange resin to form a fluid suspension in which said resins are suspended in said liquid, said anion exchange resin and said cation exchange resin having physical properties differing from each other and from the liquid; continuously flowing said suspension from said mixing zone until the desired ion exchange has been substantially effected; continuously separating said anion exchange resin, said cation exchange resin and said liquid by means of their differing physical properties; continuously and separately regenerating said anion and cation exchange resin, and continuously returning said anion and cation exchange resins to the treating system.

7. In the purification of sugar juices with ion exchange resins, the process comprising, continuously mixing in a mixing zone, the sugar juices, anion exchange resin and cation exchange resin to form a fluid suspension in which said resins are suspended in said juices, said anion and said cation exchange resins having physical properties differing from each other and from the sugar juices; continuously flowing said suspension from said mixing zone and maintaining said suspension as a flowing stream until the desired ion exchange has been substantially effected; continuously separating said anion exchange resin, said cation exchange resin and said juice by means of their differing physical properties; continuously and separately regenerating said anion and cation exchange resin, and continuously returning said anion and cation exchange resins to the treating system.

8. In the purification of sugar juices with ion exchange materials, the process comprising, continuously mixing said juices with anion exchange material and cation exchange material in a mixing zone, to form a fluid suspension in which said exchange materials are suspended in said juices, said anion and said cation exchange materials differing in physical properties from each other and from the sugar juices; continuously flowing said suspension from said mixing zone, and maintaining said suspension as a flowing stream until the desired ion exchange material has been effected, and separating the juices, the anion exchange material, and the cation exchange material.

9. In the treatment of a liquid with ion exchange materials, the process comprising, mixing untreated liquid, solid anion exchange material, and solid cation exchange material to form a fluid suspension in which said exchange materials are suspended in said liquid, said anion exchange material and said cation exchange material differing in density, and continuously flowing said suspension away from the point of the mixing until the desired ion exchange has been substantially effected; centrifugally separating said solid ion exchange materials from said liquid, and separating said anion and said cation exchange materials.

10. In the purification of sugar juices with ion exchange materials, the process comprising, mixing solid anion exchange material and solid cation exchange material, said anion and said cation exchange materials differing in density; continuously introducing the mixture of anion exchange material and cation exchange material into liquid sugar juice in a mixing zone to form a fluid suspension in which said exchange materials are suspended in said juice, continuously flowing said suspension from said mixing zone; and maintaining said suspension as a flowing stream until the desired ion exchange has been substantially effected; then continuously centrifugally separating the anion and cation exchange materials from the sugar juice, and thereafter centrifugally separating the anion exchange material from the cation exchange material.

11. In the purification of sugar juices with solid cation exchange resin and solid anion exchange resin, the process comprising, mixing said resins in amounts to maintain the pH of the ultimate mixture in a predetermined range, said resins differing in particle size; continuously mixing said resins with the sugar juices in a mixing zone to form a fluid suspension in which said resins are suspended in said juices; continuously flowing said suspension from said mixing zone; and maintaining said suspension as a flowing stream until the desired ion exchange has been substantially effected; then continuosly centrifugally separating the resins from the sugar juices, and separating the anion resin and the cation resin by means of the difference in their particle size.

12. In the purification of sugar juices with ion exchange resins, the process comprising, continuously and simultaneously mixing the cation exchange resin, the anion exchange resin and the untreated juices, in a mixing zone to form a fluid suspension in which said resins are suspended in said juices, said resins differing in physical properties from each other and from said juices; continuously flowing said suspension from said mixing zone, and maintaining said suspension as a flowing stream until the desired ion exchange has been substantially effected, and continuously centrifugally separating said juices, said anion resin and said cation resin.

13. In the purification of sugar juices with ion exchange resins, the process comprising, continuously and simultaneously mixing the cation exchange resin, the anion exchange resin and the untreated juices in a mixing zone to form a fluid suspension in which said resins are suspended in said juices, said resins differing in physical properties from each other and from said juices; continuously flowing said suspension from said mixing zone, and maintaining said suspension as a flowing stream until the desired ion exchange has been substantially effected, and separating simultaneously said juices, said anion resin and said cation resins by means of the differences in physical properties.

14. In the purification of a liquid with solid cation exchange resin and solid anion exchange resin, the process comprising, mixing the resins in amounts to maintain the pH of the ultimate mixture in a predetermined range, said resins differing in physical properties; continuously mixing the resins with the liquid to form a fluid suspension in which said resins are suspended in said liquid; continuously flowing said suspension away from the point of the initial mixing, and maintaining said suspension as a flowing stream until the desired ion exchange has been substantially effected; then continuously separating the resins from the liquid; continuously separating the anion resin and the cation resin by means of the difference in their physical properties; continuously and separately regenerating the anion exchange resin and the cation exchange resin; and continuously returning the anion exchange resin and the cation exchange resin to the purification system.

15. In the purification of a liquid with cation exchange resin and anion exchange resin, the process comprising mixing the resins in amounts to maintain the pH of the ultimate mixture in a predetermined range, said resins differing in physical properties; continuously mixing the resins with the liquid to form a fluid suspension in which said resins are suspended in said liquid; continuously flowing said suspension away from the point of initial mixing, and maintaining said suspension as a flowing stream until the desired ion exchange has been substantially effected; then separating the resins from the liquid, and separating the anion resin and the cation resin by means of the difference in their physical properties.

16. In the purification of a liquid with cation exchange material and anion exchange material, the process comprising mixing the two materials in amounts to maintain the pH of the ultimate mixture within a predetermined range, said materials differing in physical properties; continuously mixing the materials with the liquid to form a fluid suspension in which said materials are suspended in said liquid; continuously flowing said suspension away from the point of initial mixing and maintaining said suspension as a flowing stream until the desired ion exchange has been substantially effected; then separating the liquid, the anion exchange material and the cation exchange material by means of the differences in their physical properties.

DONALD W. COLLIER.

REFERENCES CITED

The following references are of record in the file of this patent:

UNITED STATES PATENTS

| Number | Name | Date |
|---|---|---|
| 2,258,216 | Ramage | Oct. 7, 1941 |
| 2,275,210 | Urbain | Mar. 3, 1942 |
| 2,388,194 | Vallez | Oct. 30, 1945 |
| 2,402,960 | Gustafson et al. | July 2, 1946 |
| 2,461,505 | Daniel | Feb. 15, 1947 |

OTHER REFERENCES

Ser. No. 359,575, Smit (A. P. C.), published May 11, 1943.

Certificate of Correction

Patent No. 2,563,006                                                        August 7, 1951

DONALD W. COLLIER

It is hereby certified that error appears in the printed specification of the above numbered patent requiring correction as follows:

Column 2, line 51, for "precess" read *process*; column 8, line 45, strike out "material";

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*